United States Patent
Grange et al.

(10) Patent No.: US 9,021,601 B2
(45) Date of Patent: Apr. 28, 2015

(54) STRONG AUTHENTICATION TOKEN USABLE WITH A PLURALITY OF INDEPENDENT APPLICATION PROVIDERS

(75) Inventors: Benoit Grange, Bordeaux (FR); Dirk Marien, Ranst (BE); Frank Hoornaert, Bertem (BE)

(73) Assignee: Vasco Data Security, Inc., Oakbrook Terrace, IL (US)

( * ) Notice: Subject to any disclaimer, the term of this patent is extended or adjusted under 35 U.S.C. 154(b) by 923 days.

(21) Appl. No.: 12/619,366

(22) Filed: Nov. 16, 2009

(65) Prior Publication Data
US 2011/0099384 A1    Apr. 28, 2011

Related U.S. Application Data

(63) Continuation-in-part of application No. 12/604,838, filed on Oct. 23, 2009.

(51) Int. Cl.
*G06F 7/04* (2006.01)
*H04L 9/16* (2006.01)
*H04L 9/08* (2006.01)
*H04L 9/32* (2006.01)

(52) U.S. Cl.
CPC ............ *H04L 9/16* (2013.01); *H04L 9/0897* (2013.01); *H04L 9/3234* (2013.01); *H04L 2209/56* (2013.01); *H04L 2209/80* (2013.01)

(58) Field of Classification Search
USPC ...................................................... 726/9, 27
See application file for complete search history.

(56) References Cited

U.S. PATENT DOCUMENTS

| | | | |
|---|---|---|---|
| 6,240,512 B1* | 5/2001 | Fang et al. | 713/150 |
| 7,802,104 B2 | 9/2010 | Dickinson et al. | |
| 2002/0120583 A1* | 8/2002 | Keresman et al. | 705/65 |
| 2004/0044739 A1 | 3/2004 | Ziegler | |
| 2007/0016943 A1 | 1/2007 | M'Raihi et al. | |
| 2007/0125838 A1* | 6/2007 | Law et al. | 235/379 |
| 2009/0210712 A1 | 8/2009 | Fort | |
| 2009/0235339 A1 | 9/2009 | Mennes et al. | |
| 2010/0142713 A1 | 6/2010 | Perlman | |
| 2012/0297185 A1 | 11/2012 | Camenisch | |

FOREIGN PATENT DOCUMENTS

| | | |
|---|---|---|
| CN | 1867877 | 11/2006 |
| CN | 1949196 A | 4/2007 |
| CN | 101218559 | 7/2008 |

OTHER PUBLICATIONS

WO 2009/115528; Bhasin Sep. 24, 2009 "Mobile Terminal Authorisation Arrangements".*
Office Action for U.S. Appl. No. 12/604,838, filed Oct. 23, 2009, dated Dec. 20, 2011.
Richard E. Smith; Authentication From Passwords to Public Keys; 2001.
USPTO Non-Final Office Action issued in U.S. Appl. No. 14/187,840 mailed Jul. 15, 2014.
Chinese First Office Action dated Jan. 22, 2014.
Chinese Search Report for patent application No. 201080047277.X filed Oct. 22, 2010 dated Jan. 15, 2014.
Translation of Chinese Second Office Action dated Dec. 8, 2014.
Chinese Supplementary Search Report for patent application No. 201080047277.X dated Nov. 28, 2014.

* cited by examiner

*Primary Examiner* — Christopher Brown
(74) *Attorney, Agent, or Firm* — RatnerPrestia

(57) ABSTRACT

The present invention defines a strong authentication token for generating different dynamic credentials for different application providers comprising an input interface providing an output representing an application provider indicator; a secret key storage for storing one or more secret keys; a variability source for providing a dynamic variable value; a key providing agent for providing an application provider specific key as a function of said application provider indicator using one or more keys stored in said secret key storage; a cryptographic agent for cryptographically combining said application provider specific key with said dynamic variable value using symmetric cryptography; a transformation agent coupled to said cryptographic agent for transforming an output of said cryptographic agent to produce a dynamic credential; and an output interface to output said dynamic credential. The present invention defines furthermore a method to manage the secret keys of strong authentication tokens that can generate dynamic credentials for more than one supported application provider or application provider group using different secret keys for each supported application provider or application provider group comprising generating for each of a batch of strong authentication tokens a token specific master key; personalizing each token of said batch with the token specific master key associated with said token; generating for each of a plurality of supported application providers or application provider groups a set of application provider specific token keys, one application provider specific token key for each token of said batch, whereby each application provider specific token key of each of said sets is derived from that token's token specific master key and a unique identifier or indicator of that application provider or application provider group; providing to each application provider or an entity that is responsible for the verification on behalf of said application provider of the dynamic credentials that are generated for said application provider, the corresponding set of application provider specific token keys.

9 Claims, 13 Drawing Sheets

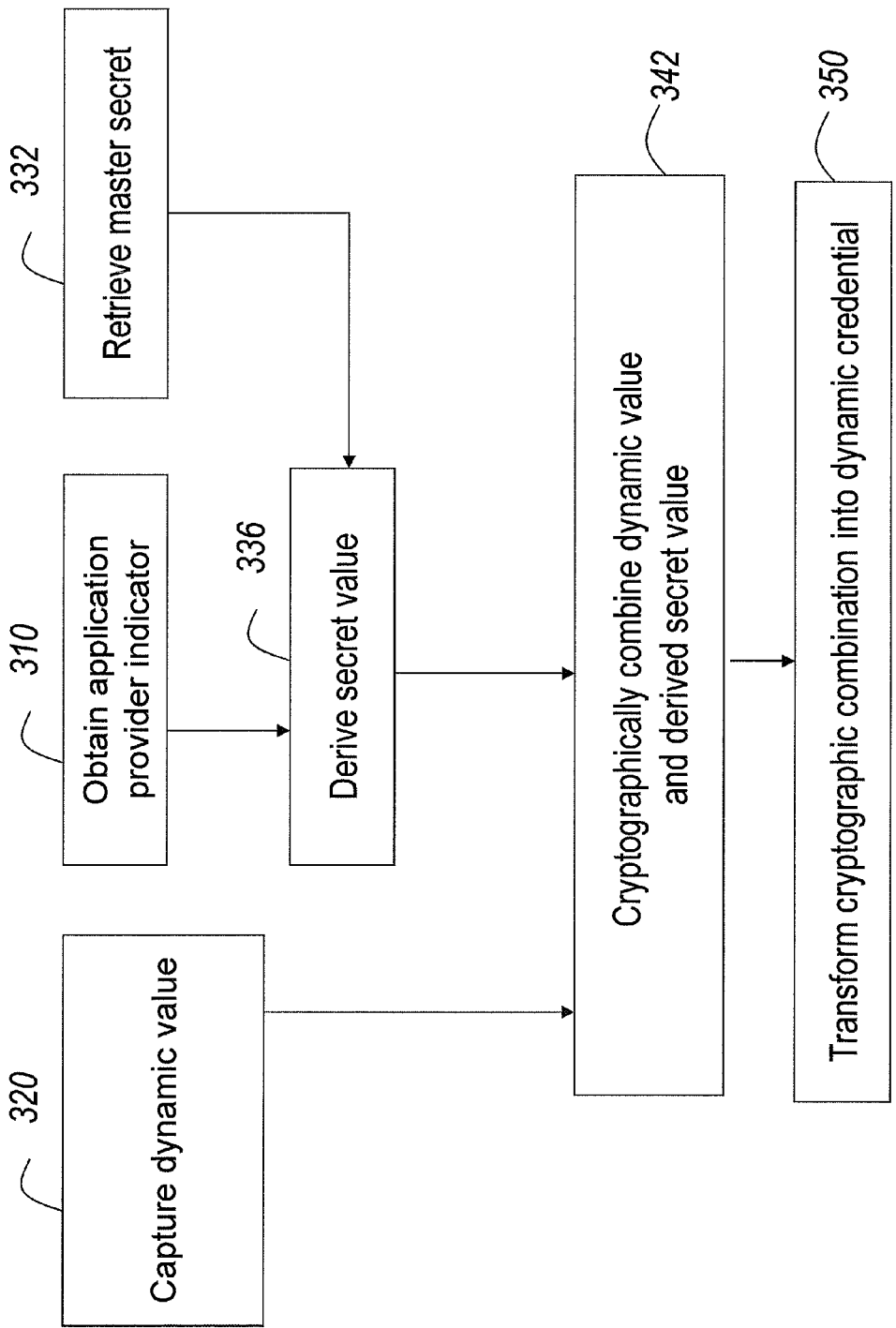

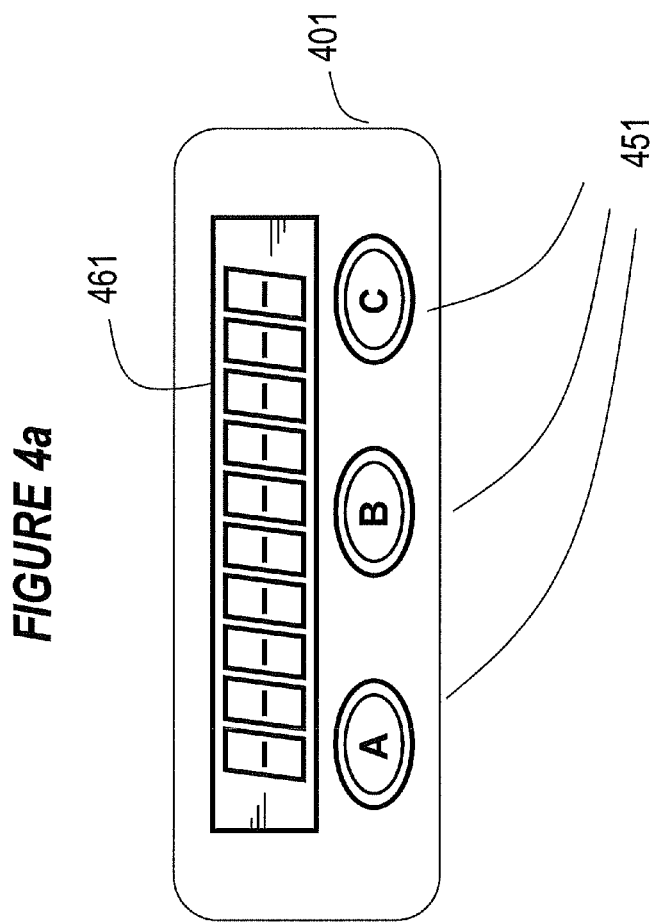

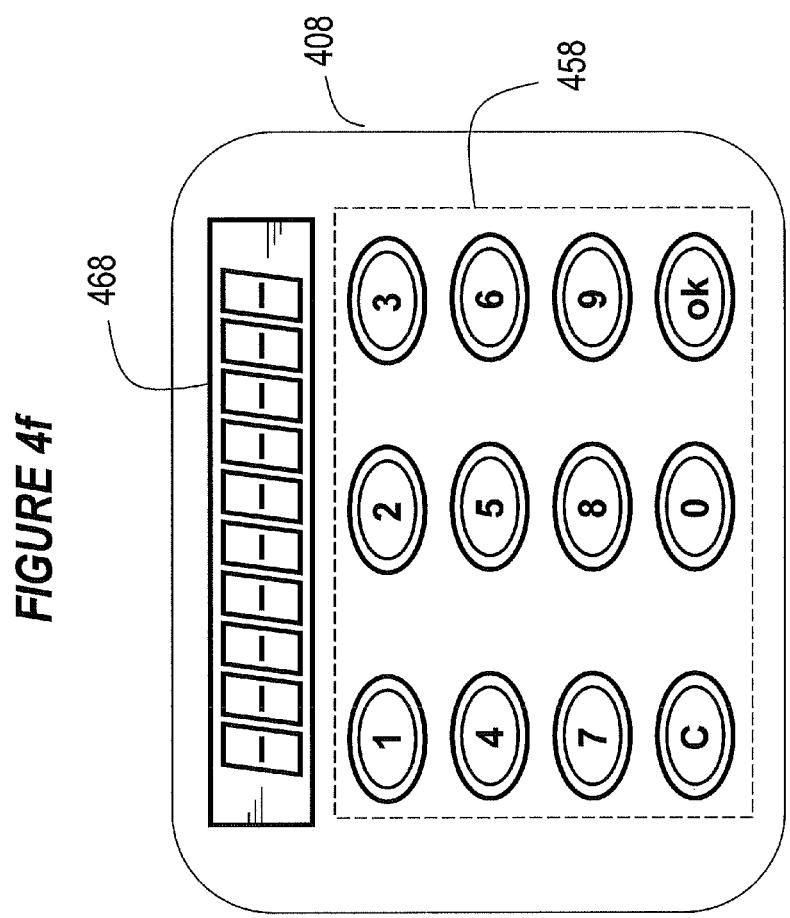

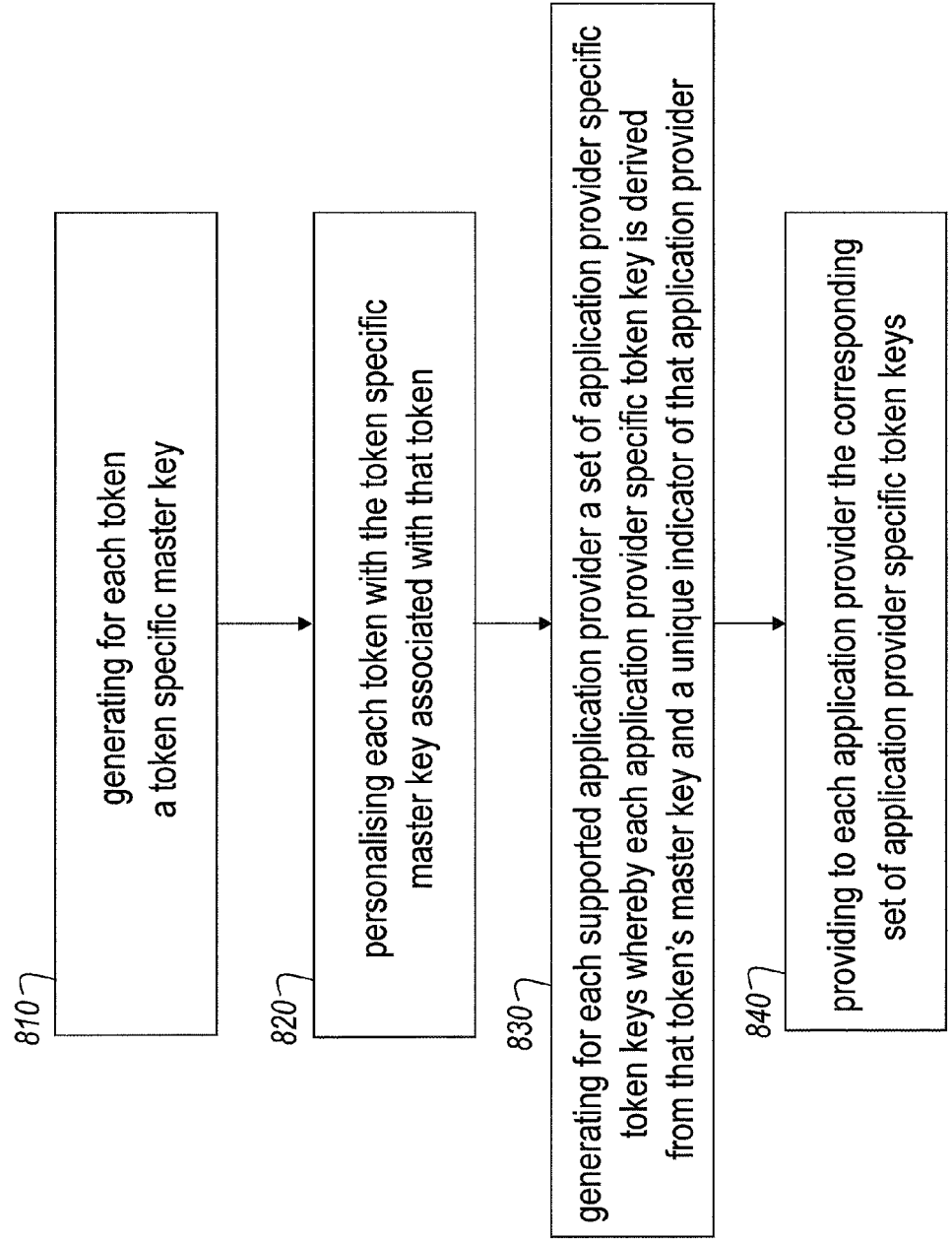

STRONG AUTHENTICATION TOKEN USABLE WITH A PLURALITY OF INDEPENDENT APPLICATION PROVIDERS

RELATED APPLICATION

The present application is a continuation-in-part of prior application Ser. No. 12/604,838 filed Oct. 23, 2009 entitled "Compact Security Device with Transaction Risk Level Approval Capability".

TECHNICAL FIELD

The present invention relates to the field of securing electronic transactions and more specifically to a strong authentication token that can be used with a plurality of independent application providers.

BACKGROUND ART

Strong authentication tokens are a type of dedicated hardware security devices that are well known in the art. They allow service providers and applications to authenticate the possessor of the token, by providing dynamic passwords that could only be generated with knowledge of a secret or key that is shared between the authentication server employed by the service provider or application on the one hand, and the authentication token on the other hand. To generate dynamic passwords, the strong authentication token applies a cryptographic algorithm to the shared secret and a dynamic variable, for example comprising one or more of a counter value, a value representing the present time, and a random challenge. Usually the dynamic password can only be used once, thus greatly enhancing the level of security with respect to static passwords. Strong authentication tokens are popular, especially to secure applications such as internet banking, because they offer a much higher level of security than static passwords combined with a high user convenience.

Some strong authentication tokens can generate transaction data signatures. Such transaction signature tokens allow service providers and applications to verify the approval of the transaction by the possessor of the token and the integrity of the transaction data, by providing electronic signatures on the transaction that could only be generated with knowledge of a secret or key that is shared between the authentication server employed by the service provider or application on the one hand, and the authentication token on the other hand. To generate electronic signatures, the transaction signature token applies a cryptographic algorithm to the shared secret and the transaction data. In some cases the transaction signature token may also include the value of a dynamic variable into the calculation of the electronic signature as a measure against replay attacks. In some cases the token generates an electronic signature by applying a cryptographic algorithm to the shared secret and a challenge whereby the challenge is mathematically related to the transaction data. The challenge may for example be calculated from a hash of the transaction data.

To verify the validity of the dynamic password or electronic signature generated by the strong authentication token, the authentication server performs essentially the same calculation as the security token to obtain a verification value using its own copy of the shared secret, and its locally kept value of the counter, the present time, the challenge it submitted to the end user, or the relevant transaction related data. The server then compares the verification value it generated with the dynamic password or electronic signature received from the user. Authentication or transaction approval is successful if the token-generated dynamic password or electronic signature submitted by the end user matches the verification value generated by the authentication server.

Most strong authentication tokens don't require a digital connection with a computer system (or have a mode of operation in which they don't require such a connection), but instead rely on the user to exchange data between the token and an application secured by that token. Examples of such data being exchanged include input data received from a user such as a challenge or transaction data and output data such as a dynamic password or signature generated by the token for the user. In typical strong authentication tokens this data exchange via the user comprises the user's manually transferring data between the token and a computer. To facilitate this manual transfer, the generated dynamic passwords or signatures have a modest size that is in most cases smaller than the cryptograms that are used for generating these dynamic passwords or signatures. In other words the generation of the dynamic passwords or signatures in general implies some form of truncation of the cryptograms and as a consequence the generated dynamic passwords or signatures can in general not convey all the information contained in these cryptograms to the authentication server. However, thanks to the usage of symmetric cryptography, an authentication server that has access to a strong authentication token's secret key can calculate a verification value that has to be compared with a received dynamic password or signature to validate whether the received dynamic password or signature has indeed been generated with that particular token.

The fact that strong authentication tokens don't require a digital connection with a computer system makes strong authentication tokens fully independent of any technical characteristics of any computer system being used such as operating system version, driver support and particular technical input/output interfaces. This represents a huge advantage of strong authentication tokens with respect to other security devices such as smartcards or USB keys which require for example smart card readers, USB connectors and corresponding driver software, which are not universally supported by all computer systems that users may want to use or which may be plagued by interoperability and compatibility problems.

Typical strong authentication tokens have a display for communicating the generated dynamic credentials such as one-time passwords or electronic signatures to the end user, and a button or keypad to request the generation of a new credential and/or to enter challenges, transaction data, PIN codes, etc. Other known communicating devices for strong authentication tokens include an auditory output generator, USB interfaces, and wireless interfaces. Other known input devices for strong authentication tokens include optical sensors, USB interfaces, and wireless interfaces.

Some strong authentication tokens require the user to enter a PIN code to perform certain actions such as generating an electronic signature. In some cases the user also submits to the authentication server a static password in addition to the dynamic password generated by a strong authentication token as a counter measure against the fraudulent use of lost or stolen tokens.

The range of products sold by Vasco Data Security under the brand DIGIPASS contains several examples of strong authentication tokens as described above.

DISCLOSURE OF THE INVENTION

Technical Problem

The usage of symmetric cryptography in strong authentication tokens has the advantage that it allows for relatively short dynamic credentials such as one-time passwords and electronic signatures but it also has a drawback. In contrast to asymmetric cryptography, symmetric cryptography implies that any party that wants to validate a cryptographic value (such as the dynamic passwords or signatures of strong authentication tokens) that has been generated with a particular secret must have access to the value of that particular secret. This causes problems if the user wants to interact in a safe way with more than one application provider since each application provider must have access to the user's secrets. So far the following methods have been known to deal with this problem.

In most cases it is simply accepted that a particular strong authentication token can only be used with a particular application provider. This has the disadvantage that a user must have as many tokens as there are application providers with whom that user wants to interact. This redundancy comes with a cost of course, and users, especially active users that interact with many application providers, might be annoyed having to manage a multitude of tokens.

In another solution different application providers share the tokens' secrets. This requires that the different application providers sharing the secrets trust each other and have confidence in each other's security systems and practices. In reality it is however very difficult for different application providers to ensure that they adhere to the same security practices and to agree on how these shared secrets should be managed and how the liabilities associated with security breaches should be handled.

In a third solution only one application provider has access to the token secrets and offers the other application providers the service of validating the credentials generated by the tokens. This makes the other application providers operationally dependent on the provider that manages the token secrets which means that some service level agreement may have to be negotiated. Also, the provider managing the token secrets might be reluctant to de facto encourage its users to generate valid dynamic passwords and signatures and provide them to other parties. Indeed, once users are accustomed to the idea that many different providers may legitimately ask for the same dynamic passwords and signatures, it may become easier for fraudsters to set up social engineering and phishing attacks that are convincing enough for ordinary users to hand over valid dynamic passwords and generate valid signatures on certain data.

What is needed are security devices that offer all the advantages of existing strong authentication tokens (i.e. high level of security, high level of user convenience, independence of the user's computer system) while at the same time offering the capability of securing applications of different application providers without the requirement for these different application providers to share secrets or to be dependent on each other for validation of the dynamical passwords or signatures generated by the security devices.

Technical Solution

The present invention is based on the insight that if a strong authentication token that employs symmetric cryptography uses different secrets to generate dynamic passwords or signatures depending on the application provider for which the generated dynamic passwords or signatures are destined, then each application provider only needs to know the secret that the strong authentication token associates with that application provider to be able to autonomously validate the dynamic passwords or signatures generated for that provider without having to share a secret with other providers and without requiring the assistance of another provider.

The invention is furthermore based on the insight that it is possible for the strong authentication token to use the correct secret for a particular application provider if it has a user interface that allows a user to give an indication of the application or application provider for which that user requests that a dynamic password or signature be generated.

A preferred embodiment of the present invention includes a security apparatus for generating dynamic credentials such as one-time passwords or electronic signatures on transaction data. The security apparatus for generating dynamic credentials preferably has a compact form factor and a simple user interface requiring few user interactions. The user interface preferably comprises an input device that allows the user to instruct the security apparatus to generate a dynamic credential and to give the token an indication which secret should be used to generate a credential for a selected application or application provider. The user interface preferably also comprises an output device to communicate to the user generated credentials or the like.

In one embodiment the input device may for example comprise one or more buttons or a thumb wheel. The buttons may be keys of a keypad. In one particular embodiment the user selects an application or application provider related indicator by pressing or pushing a specific button or combination of buttons associated with that application provider or application provider group. In another particular embodiment the user selects the appropriate application provider related indicator by scrolling through a list of labels, each label representing a particular application provider related indicator. In a specific embodiment the user scrolls through this list by repeatedly pushing a button. In another specific embodiment the user selects the appropriate application provider related indicator by quickly pressing a specific button a number of times whereby the number of times that the button has been pressed indicates which application provider related indicator the user intends to select. In yet another particular embodiment the user scrolls through the list using a thumb wheel. In still another particular embodiment the user instructs the security apparatus to generate a dynamic credential for a selected application provider related indicator by pressing a button or pushing a thumb wheel. In yet another specific embodiment the security apparatus automatically generates a dynamic credential for a currently selected application provider related indicator after a certain wait time during which the user doesn't select another application provider related indicator. In one more embodiment the user enters an application provider indicator for example by using the keys of a keypad.

In another embodiment the security apparatus' user interface comprises an output device to communicate either a generated dynamic credential to the user or to indicate which application provider related indicator is currently selected. The output device may for example comprise a display or a generator to generate audible signals which may include synthesized speech or recorded voice snippets. In some embodiments the currently selected application provider related indicator is indicated using labels. These labels may be numeric or may comprise words. In a specific embodiment these labels may refer directly to application providers or to a group of application providers. In a specific embodiment these labels may refer to applications or to a class of applications. In another specific embodiment these labels may refer to certain characteristics of applications or application providers that are easily discernible and meaningful to the user.

In one embodiment the security apparatus has the form factor of a strong authentication token. In another embodiment the security apparatus has the form factor of a credit card. In a preferred embodiment the security apparatus has the form factor of a one-button strong authentication token.

To improve the security level, the dynamic credentials are preferably unpredictable. Preferably it should be hard for any attacker to obtain or generate valid dynamic credentials. One way of generating unpredictable dynamic credentials involves the use of a cryptographic algorithm parameterized with one or more secret values. Preferably at least one of these secrets is directly or indirectly associated with the user. The cryptographic algorithm may comprise a symmetric algorithm such as a symmetric encryption or decryption algorithm (for example DES or AES) or it may comprise a one-way function such as a hash function (for example MD5 or members of the SHA family of hash functions). The cryptographic algorithm may also comprise the generation of a message authentication code or a keyed-hash message authentication code. In addition to an indicator related to the application or application provider for which the dynamic credential is generated, the dynamic credential generation algorithm may also take into account the value of a dynamic variable such as one or more of the value of a counter, a time related value, a challenge or transaction related data. In one embodiment the dynamic credential generation comprises applying an algorithm involving cryptographic operations to one or more secrets, a dynamic variable, and a value related to an application provider indicator. In another embodiment the dynamic credential generation comprises selecting a secret from a set of secrets based on the application provider indicator and applying a cryptographic algorithm to the selected secret and a dynamic variable. In yet another embodiment the dynamic credential generation comprises deriving a secret key from a master key and the application provider indicator and applying a cryptographic algorithm to the derived secret key and a dynamic variable. In a typical embodiment the dynamic credential generation comprises a step of obtaining a bit string by truncating or selecting some bits from a cryptogram or cryptographically generated value. The resulting bit string is typically converted into a string of human-understandable symbols to be presented to the user. This conversion may for example comprise decimalisation of the bit string or dividing the bit string into a string of groups of bits and replacing each group of bits by an appropriate symbol value. These symbol values may comprise decimal or hexadecimal digits or characters from an alphabet.

In a preferred embodiment of the invention a dynamic credential is verified by a validation server using a verification reference value. In one embodiment said verification reference value is generated using the same or a similar algorithm that was used to generate the dynamic credential. In another embodiment the verification reference value is generated using a secret that is directly or indirectly associated with the user or a security device used by the user to generate the dynamic credential. In a specific embodiment this secret is retrieved from a database. In another specific embodiment this secret is generated using a master secret and a value that is directly or indirectly associated with the user or a security device used by the user to generate the dynamic credential. In yet another embodiment the verification reference value is compared with the dynamic credential received from the user, and the dynamic credential is successfully validated if it matches with the verification reference value according to some matching criterion. In a specific embodiment the matching criterion may require that both values are equal.

In some embodiments, some steps of the validation process may be performed by a computer system. This computer system may comprise a server computer. It may also comprise a database and it may also comprise a Hardware Security Module (HSM) to perform certain cryptographic operations.

In one particular embodiment a plurality of strong authentication tokens is distributed among a plurality of users. Prior to distribution, each token has been personalised with a set of secret values, each secret value corresponding to a different indicator of a supported application provider or group of application providers. Each application provider or group of application providers is provided with a list of the token secrets that correspond to that provider or group of providers. In general an application provider only receives the secrets that correspond to that application provider and will not receive secrets that correspond to other application providers. The list of token secrets that is provided to a particular application provider or group of application provider may consist of a file or database, preferably encrypted, that lists for each individual token the secret of that token that corresponds to that application provider or group of application providers. To generate a dynamic credential for a specific application provider, a user selects the appropriate application provider indicator on the token and instructs the token to generate a dynamic credential for that indicator. From its stored set of secrets the token selects the secret that corresponds to the selected indicator and applies a cryptographic algorithm to this selected secret and the value of a dynamic variable to generate the requested dynamic credential. The token then communicates the generated dynamic credential to the user, for example by means of a display or by means of audible signals. The user then forwards the dynamic credential to the appropriate application provider. The application provider retrieves from a database information revealing which token has been distributed to that user and which application provider specific secret is used by that token for that application provider. The application provider applies a cryptographic algorithm to that retrieved secret and a dynamic value to generate a verification reference value. The application provider compares the received dynamic credential with the generated verification reference value. The dynamic credential is validated successfully if it matches the verification reference value.

In another embodiment each token is personalised with a token specific master key. Each application provider specific token secret is derived from the token specific master secret and a value related to the token's indicator for that application provider. A supported application provider receives a list of the application provider specific token secrets that have been derived from the indicator corresponding to that application provider and each token's specific master key. In general the token specific master keys are not provided to the application providers. As a matter of fact the token specific master keys can be destroyed once the tokens have been personalised and the application provider specific token secrets have been derived and have securely been stored or provided to the application providers. The token specific master keys themselves can for example be randomly generated or can for example be derived for each token in turn from a single general master key and some data element that is specific for an individual token such as a token's serial number. To generate a dynamic credential for a specific application provider, a user selects the appropriate application provider indicator on the token and instructs the token to generate a dynamic credential for that indicator. The token derives the application provider specific token secret key from the token specific master key and the value related to the token's indicator for that application provider. The token generates the dynamic credential using the derived application provider specific token secret key and a dynamic variable. This embodiment has the distinct advantage that the amount of memory required to securely store secrets in the token does not have to grow with the number of supported application providers.

In one variation of this embodiment the value related to the token's indicator for that application provider is an application provider code entered by the user. In a specific variation the user must enter the application provider code each time a dynamic credential is generated. In another specific variation the token has a mode of operation allowing the user to enter an application provider code and to associate that application provider code with a label that will function as an application provider indicator. If the user then subsequently selects that label to generate a dynamic credential the token will derive the application provider specific token secret key using the application provider code associated with that label as application provider related value and the token specific master secret and generate the dynamic credential with the derived application provider specific secret key and a dynamic value.

In some embodiments where the application provider specific token secret is derived from a token specific master secret and a value related to the token's indicator for that application provider, it may be preferable to not destroy or discard the token specific master keys once the tokens have been personalised, but instead store them securely for later use. This may be especially interesting in cases where the application provider indicator or the value related to the application provider indicator is not selected from a static list but can be dynamically provided to the token for example through a user-to-machine or machine-to-machine input interface. This allows generating application provider specific token secrets for application providers with application provider indicators that were unknown or had not been anticipated when the tokens were personalised. This way, new application providers can be added to the list of supported application providers even after the tokens have already been personalised and distributed to the users. Supporting a new application provider then doesn't require any new tokens to be distributed. It suffices that a new application provider indicator is allocated for that new application provider and that a list of application provider specific token secrets for that new application provider indicator is derived using the securely stored token specific master secrets and that this list of application provider specific token secrets is then provided to that new application provider.

In yet another embodiment the application provider specific token secret for each token is derived from an application provider specific master secret and a token identifier such as for example the token's serial number. A different application provider specific master secret is associated with each supported application provider or application provider group. Each token is personalised with a set of derived application provider specific token secrets, one for each supported application provider or application provider group. Each supported application provider or application provider group is provided with the value of the application provider specific master secret associated with that application provider or application provider group.

In still another embodiment besides the application provider specific token secret, other parameters of the algorithm to generate dynamic credentials may be a function of the selected application provider or application provider group. These parameters may include for example the length of the dynamic credential or which cryptographic algorithm is used or which dynamic variable value is being used or how the dynamic credential is being represented. For example for one application provider an OTP of 9 decimal digits may be generated using the AES algorithm and the value of a real-time clock, while for another application provider an OTP of 6 hexadecimal digits may be generated using a keyed hash algorithm and the value of a counter. In cases where counters are being used as dynamic variable it may be preferable that the token maintains independent counters for different application providers or application provider groups.

Advantageous Effects

An important advantage of the present invention is that users can use the same strong authentication token to generate dynamic credentials for different application providers without the need for these application providers to share secrets or to be operationally dependent one upon the other. The security level of strong authentication tokens according to the invention is the same as the security offered by other existing strong authentication tokens. The form factor of strong authentication tokens according to the invention can be the same as or can be very similar to the form factor of other strong authentication tokens. Strong authentication tokens according to the invention have a user interface and offer a user convenience that is very similar to that of other existing strong authentication tokens. In addition users gain the convenience of needing only one security device to secure their dealings with a plurality of application providers.

As a consequence the costs of strong authentication tokens, including the cost of distribution, can be divided over a plurality of application providers. Different application providers can create partnerships sharing the same strong authentication tokens, thus reducing their costs, without requiring an integration of their security systems.

This is illustrated in the following example. To secure its internet banking application a bank may distribute one-button strong authentication tokens among its customers. These strong authentication tokens are capable of generating one-time passwords (OTPs). If users press the button of their token once the token displays the brand name of the bank. If users quickly press the button of the token twice the token displays the brand of a credit card company that has a strategic alliance with the bank and that wants to leverage the bank's strong authentication tokens to secure its online card payment application for example to authenticate users by means of an OTP in the context of a secure online payment protocol such as for example the 3D-Secure protocol. If, after pressing the button of the token, a user waits a little while (for example two seconds) then the token generates a one-time password for the application provider whose brand name is being displayed (i.e. either the bank or the credit card company). To make the distinction between these two kinds of one-time passwords more obvious to users, the bank OTP and the credit card OTP may have a different length. Each token stores two secret keys: one key associated with the bank and another key associated with the credit card company. To generate an OTP the token selects the correct key as a function of the brand name that was selected by the user and applies a cryptographic algorithm to the value of its real-time clock using the selected secret key. To verify the bank OTPs, the bank has a database with token bank application specific secrets. To verify the credit card OTPs, the credit card company has a database with token credit card application specific secrets. The credit card company may have received this database from its strategic partner the bank or it may have received it directly from the party responsible for generating the token secrets and personalising the tokens with these secrets. This party may be the token manufacturer.

In some embodiments it is even possible to add extra supported application providers even after the tokens have already been personalised and distributed to the users.

The advantages of the invention become particularly apparent when considering flexible credit card shaped security devices. The technology to produce such devices is not yet mature, requiring costly components and often resulting in yield and reliability problems. As a consequence flexible credit card shaped strong authentication tokens are quite expensive. The present invention allows production of flexible credit card shaped strong authentication tokens that at no extra cost can generate dynamic credentials not just for one application or application provider but for a plurality of applications or application providers. That means that the relatively high cost of these credit card shaped strong authentication tokens can be divided over a plurality of application providers.

BRIEF DESCRIPTION OF THE DRAWINGS

FIG. 3 illustrates another method to generate dynamic credentials for different application providers in accordance with yet another embodiment of the invention.

FIG. 4a illustrates a particular form factor of a security apparatus to generate dynamic credentials for different application providers.

FIG. 4f illustrates yet one more form factor of a security apparatus to generate dynamic credentials for different application providers.

FIG. 8 illustrates yet another method to manage the secret keys of strong authentication tokens that can generate dynamic credentials for different application providers in accordance with an embodiment of the invention.

MODE(S) FOR CARRYING OUT THE INVENTION

Figure 1:
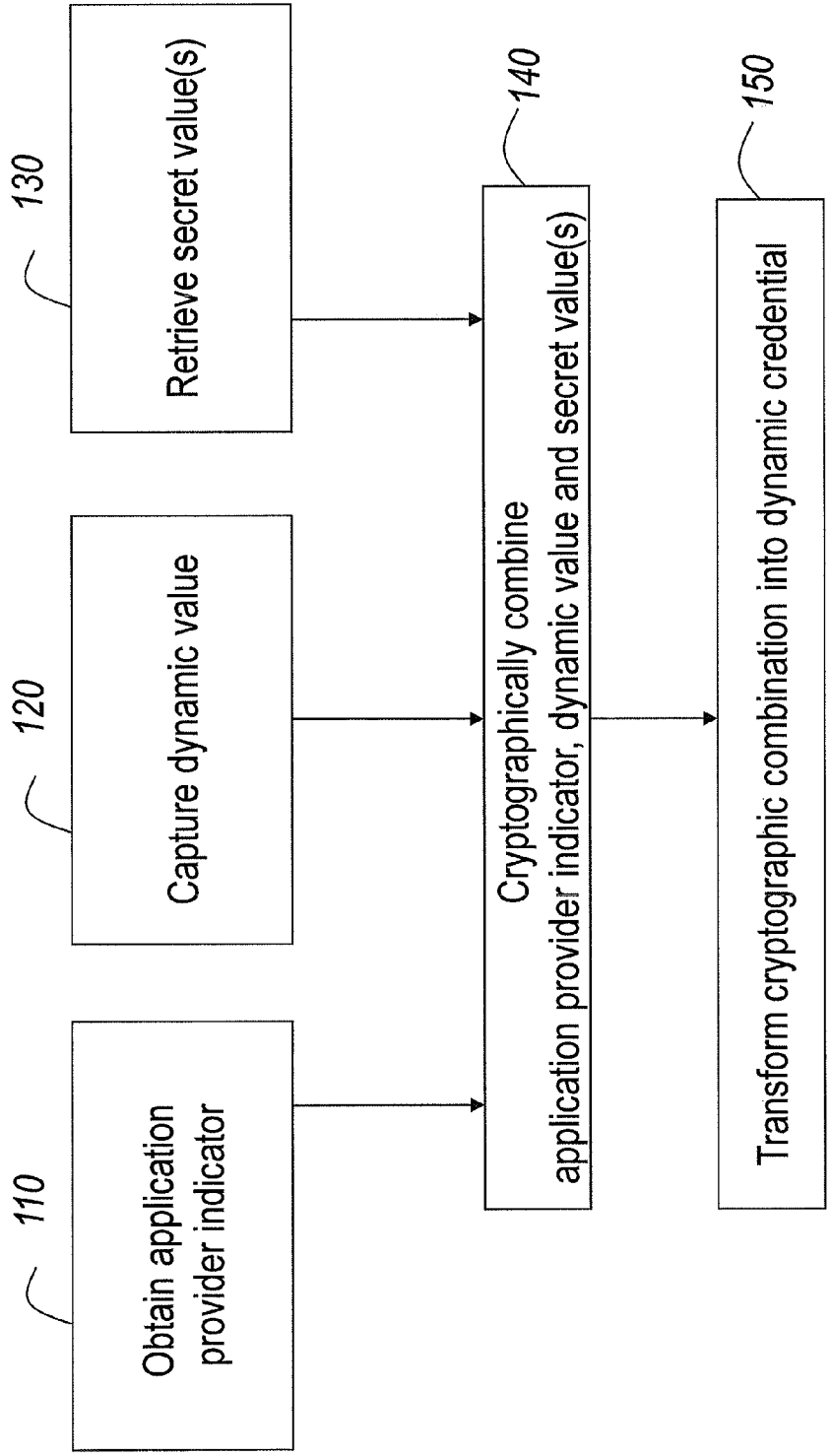
FIG. 1 illustrates a method to generate dynamic credentials for different application providers in accordance with one embodiment of the invention.

FIG. 1 illustrates a preferred method according to the invention to generate a dynamic credential for a specific application provider or application provider group comprising the steps of:
  obtaining an indicator of the application provider or application provider group (step 110);
  capturing the value of at least one dynamic variable (step 120);
  retrieving one or more secret values (step 130);
  cryptographically combining said application provider indicator, said dynamic value and said one or more secret values (step 140) using a symmetric cryptographic algorithm; and
  transforming the result of said cryptographic combination into a dynamic credential (step 150) which in a typical case is different from the result of the cryptographic combination.

In one embodiment the dynamic variable may comprise a time related value. In a specific embodiment the dynamic variable comprises the value of a real-time clock. In another embodiment the dynamic variable comprises the value of a counter. In a specific embodiment this counter may be specific for the application provider. In yet another embodiment the dynamic variable may comprise a challenge or transaction related data. In one embodiment the symmetric cryptographic algorithm may comprise a symmetric encryption or decryption algorithm. In another embodiment the symmetric cryptographic algorithm may comprise a hashing algorithm. In still another embodiment the cryptographic combination of the indicator, the dynamic value and the one or more secret values comprises the generation of a cryptogram using a mathematical combination of the application provider indicator and the dynamic value and using a symmetric cryptographic algorithm that is parameterized with said one or more secret values. In a specific embodiment the dynamic value that is captured is a dynamic variable that is chosen from a plurality of dynamic variables depending on the value of the application provider indicator. In another specific embodiment the cryptographic algorithm being used may be chosen as a function of the application provider indicator. In one more embodiment other parameters of the algorithm to generate dynamic credentials may also be function of the application provider indicator such as for example the length of the generated credential or the symbols that are used to represent the credential to the user.

Figure 2:
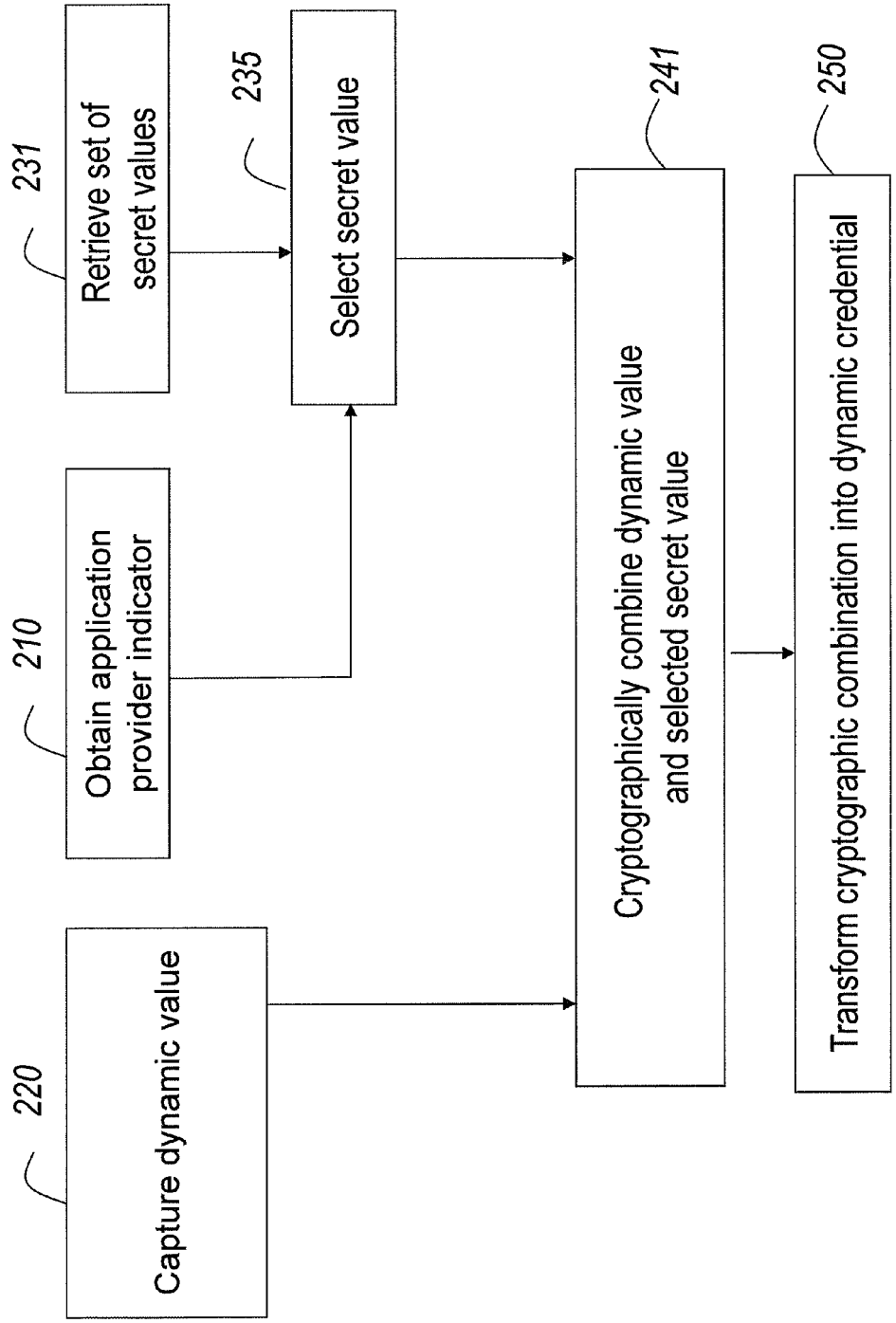
FIG. 2 illustrates an alternative method to generate dynamic credentials for different application providers in accordance with another embodiment of the invention.

An alternative method according to the invention to generate a dynamic credential for a specific application provider or application provider group is illustrated in FIG. 2 and comprises the steps of:
  obtaining an indicator of the application provider or application provider group (step 210);
  capturing the value of at least one dynamic variable (step 220);
  retrieving a set of secret values (step 231);
  selecting at least one secret value out of the retrieved set of secret values on the basis of the value of the application provider indicator (step 235);
  cryptographically combining said dynamic value and said selected secret value (step 241) using a symmetric cryptographic algorithm; and
  transforming the result of said cryptographic combination into a dynamic credential (step 250) which in a typical case is different from the result of the cryptographic combination.

Yet another method according to the invention to generate a dynamic credential for a specific application provider or application provider group is illustrated in FIG. 3 and comprises the steps of:
- obtaining an indicator of the application provider or application provider group (step 310);
- capturing the value of at least one dynamic variable (step 320);
- retrieving the value of a token specific master secret (step 332);
- deriving a secret value from the retrieved master secret and the application provider indicator (step 336);
- cryptographically combining said dynamic value and said derived secret value (step 342) using a symmetric cryptographic algorithm; and
- transforming the result of said cryptographic combination into a dynamic credential (step 350) which in a typical case is different from the result of the cryptographic combination.

In one embodiment the step of deriving a secret value from the retrieved master secret and the application provider indicator comprises cryptographically combining the master secret and data related to the application provider indicator. In a specific embodiment the cryptographically combining comprises using an encryption or decryption algorithm acting on data related to the application provider indicator and parameterized with the master secret. In another specific embodiment cryptographically combining comprises hashing data related to the application provider indicator and the master secret.

One embodiment of the invention comprises a security apparatus to generate dynamic credentials for a plurality of application providers. A security apparatus to generate dynamic credentials is typically provided in the form of a handheld, battery-powered apparatus with an output device such as a display to convey dynamic credentials and other information to the user. Preferably, the apparatus has one or more buttons or other input devices to trigger the generation of a dynamic credential and/or to select the application provider for which an dynamic credential should be generated and/or to input an application provider indicator.

Figure 5:
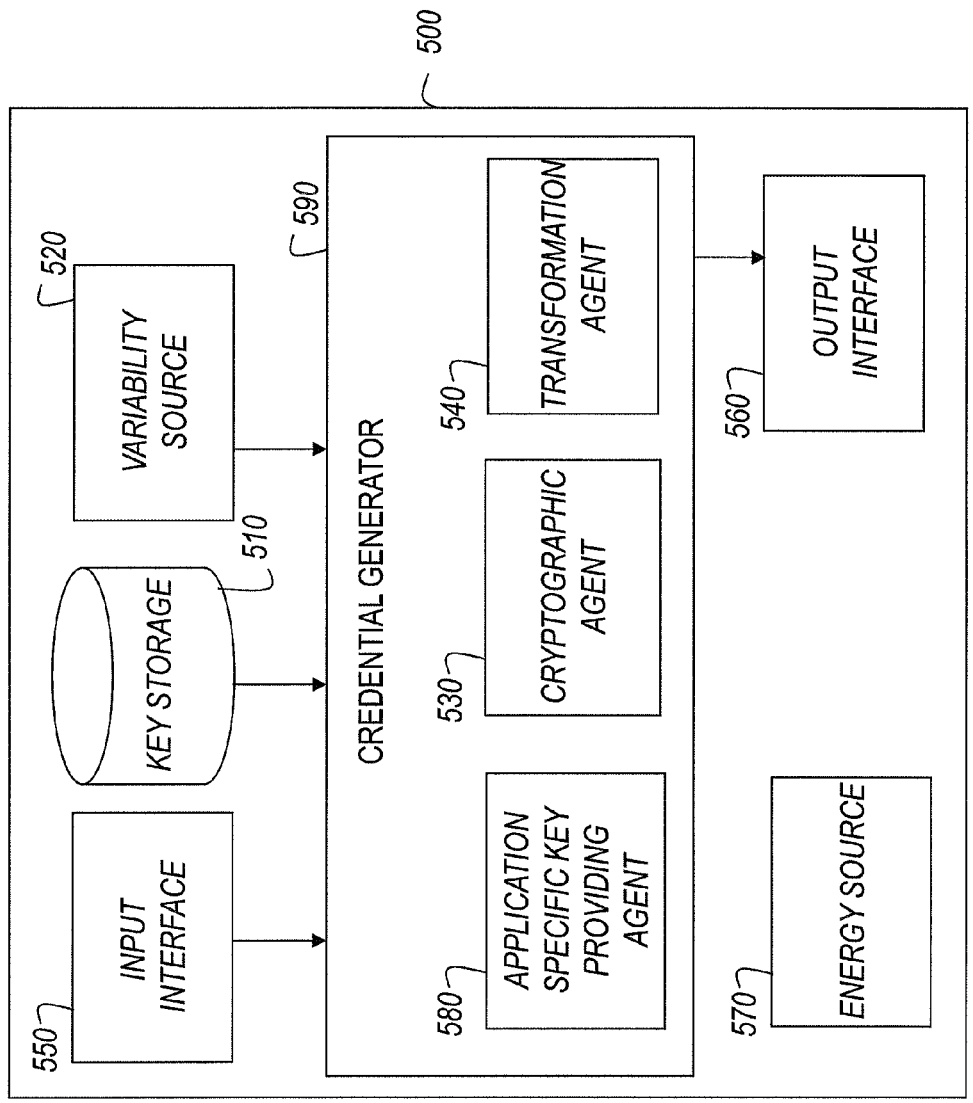
FIG. 5 illustrates a security apparatus to generate dynamic credentials for different application providers in accordance with one embodiment of the invention.

In a preferred embodiment of the apparatus of the present invention, as illustrated in FIG. 5, the apparatus is a security token 500 to generate dynamic credentials for a plurality of application providers. The security token 500 typically comprises a secret key storage 510, a variability source 520, an input interface 550, a credential generating agent 590, an output interface 560, and an energy source 570. The credential generator 590 typically comprises an application provider specific token key providing agent 580, a cryptographic agent 530, and a transformation agent 540.

The secret key storage 510 stores one or more secret keys—preferably in a secure way—that may be used in the generation of dynamic credentials for different application providers. The stored keys may comprise a token specific master key that the token uses to derive application provider specific token keys for supported application providers with the corresponding application provider indicators. Alternatively, the stored keys may comprise the application provider specific token keys. The secret key storage 510 may comprise volatile memory, such as the memory of a processor or microcontroller already present in the token, or a separate random access memory (RAM) component, whereby this memory is permanently powered by a battery to prevent loss of the stored data. Alternatively, the secret key storage 510 may be persistent memory such as a flash memory component.

Variability source 520 provides a dynamic variable which may comprise a time-related value or a counter value or a challenge or transaction related data. Variability source 520 may comprise a real-time clock or a counter. The counter may be automatically incremented each time that a dynamic credential is generated. The variability source may also comprise an input interface through which the token may be provided with a challenge or transaction related data.

The credential generating agent 590 may comprise one or more appropriately programmed processors or microcontrollers, or dedicated hardware such as an Application-Specific Integrated Circuit (ASIC) or Field-Programmable Gate Array (FPGA).

Cryptographic agent 530 may be an appropriately programmed processor or microcontroller, or dedicated hardware such as an Application-Specific Integrated Circuit (ASIC) or Field-Programmable Gate Array (FPGA).

Also the transformation agent 540 and the application provider specific token key providing agent 580 may be appropriately programmed processors or microcontrollers, or dedicated hardware such as an Application-Specific Integrated Circuit (ASIC) or Field-Programmable Gate Array (FPGA).

The application provider specific token key providing agent 580, cryptographic agent 530 and the transformation agent 540 may be implemented on the same hardware platform or on different hardware platforms.

Input interface 550, which may comprise a human interface device or a machine-to-machine interface, allows the user to instruct the token to generate a dynamic credential or to select an application provider or application provider group for which a dynamic credential should be generated or to enter an application provider indicator. The human interface device may comprise one or more buttons. The human interface input device may also or alternatively comprise a thumb wheel.

Generated dynamic credentials may be provided to the end user through output interface 560. In another embodiment the token includes a dynamic credential output interface 560, such as a human interface device or a machine-to-machine interface, adapted to output a generated dynamic credential. The human interface output device may comprise a visual output device, such as a display, or an audible output device, such as a source of synthesized speech. The dynamic credential that is output by the human interface output device may be communicated to the user as a string or sequence of human-interpretable symbols.

The machine-to-machine interface of input interface 550 or output interface 560 may comprise a USB, Ethernet, serial, or other wired interface, or a Bluetooth, WiFi, cellular or other wireless interface.

Energy source 570 provides the energy required by the other components. Energy source 570 may comprise a battery, a photo-voltaic cell, a fuel cell, a thermo-electric element, an agent adapted to scavenge ambient energy, or any other energy source that is compatible with the energy requirements of the other components and the overall cost and form factor requirements of security token 500.

The security token 500 typically operates as follows. By means of the input interface 550 the user selects an appropriate application provider indicator or enters an application provider indicator and instructs the token to generate a corresponding dynamic credential. Credential generator 590 cryptographically combines one or more keys retrieved from secret key storage 510 with the value of a dynamic variable provided by variability source 520 and an application provider indicator selected or entered by the user through input interface 550 to generate a dynamic credential. The token outputs the generated dynamic credential by means of output interface 560. In one embodiment credential generator 590 uses symmetric cryptography to generate dynamic credentials.

In a preferred embodiment credential generator 590 comprises an application provider specific token key providing agent 580, a cryptographic agent 530, and a transformation agent 540. In one embodiment application provider specific token key providing agent 580 provides an application provider specific token key as a function of an application provider indicator selected or entered by the user through input interface 550 using one or more keys stored in secret key storage 510; cryptographic agent 530 cryptographically combines the application provider specific token key with the value of a dynamic variable provided by variability source 520; and transformation agent 540 transforms the result of the cryptographic combination into a dynamic credential. In one embodiment cryptographic agent 530 uses symmetric cryptography. In a specific embodiment application provider specific token key providing agent 580 provides an application provider specific token key by selecting the appropriate key from a plurality of keys stored in secret key storage 510 as a function of the application provider indicator. Secret key storage 510 typically stores a different key for each supported application provider or application provider group. In another specific embodiment application provider specific token key providing agent 580 derives an application provider specific token key from a token specific master key stored in secret key storage 510 and a value related to the application provider indicator. Key providing agent 580 typically uses symmetric cryptography to derive the application specific token key.

In yet another embodiment cryptographic agent 530 generates a plurality of cryptograms using a plurality of application provider specific token keys and the dynamic value provided by variability source 520, and credential generator 590 selects a cryptogram as a function of the application provider indicator. In still another embodiment transformation agent 540 transforms a plurality of cryptograms into a plurality of dynamic credentials and credential generator 590 selects a dynamic credential as a function of the application provider indicator.

In one embodiment the components of token 500 are arranged on a substrate such as a PCB. In another embodiment these components are housed in a protective shell which may be of plastic. In yet another embodiment these components are embedded in a laminated medium.

FIG. 4a illustrates a particular embodiment of a security apparatus according to the invention comprising a token 401 to generate dynamic credentials for different application providers. The output interface comprises a display 461. The input interface comprises a number of buttons 451, one for each different application provider or application provider group. In the illustrated example the token has three buttons because it supports the generation of dynamic credentials for three different application providers or application provider groups. A label or symbol indicating the corresponding application provider or application provider group may be printed on the token's plastic housing close to each button or the buttons themselves. When the user presses a button the token powers on, generates a dynamic credential for the selected application provider or application provider group and outputs the generated dynamic credential on its display.

Figure 4B:
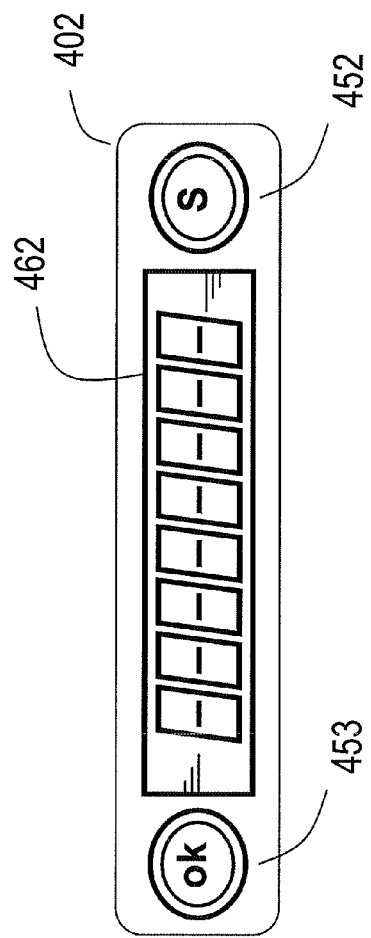
FIG. 4b illustrates another form factor of a security apparatus to generate dynamic credentials for different application providers.

FIG. 4b illustrates another particular embodiment of a security apparatus according to the invention comprising a token 402 to generate dynamic credentials for different application providers. The output interface comprises a display 462. The input interface comprises two buttons 452/453. One button 452 allows the user to cycle through a list of application providers or application provider groups. When the user presses this button the token selects the following application provider or application provider group. The token indicates which application provider or application provider group is currently selected by means of an appropriate label or symbol that is displayed on the display 462. If the user presses the other button 453 the token generates a dynamic credential for the currently selected application provider or application provider group and outputs this generated dynamic credential on its display 462.

Figure 4C:
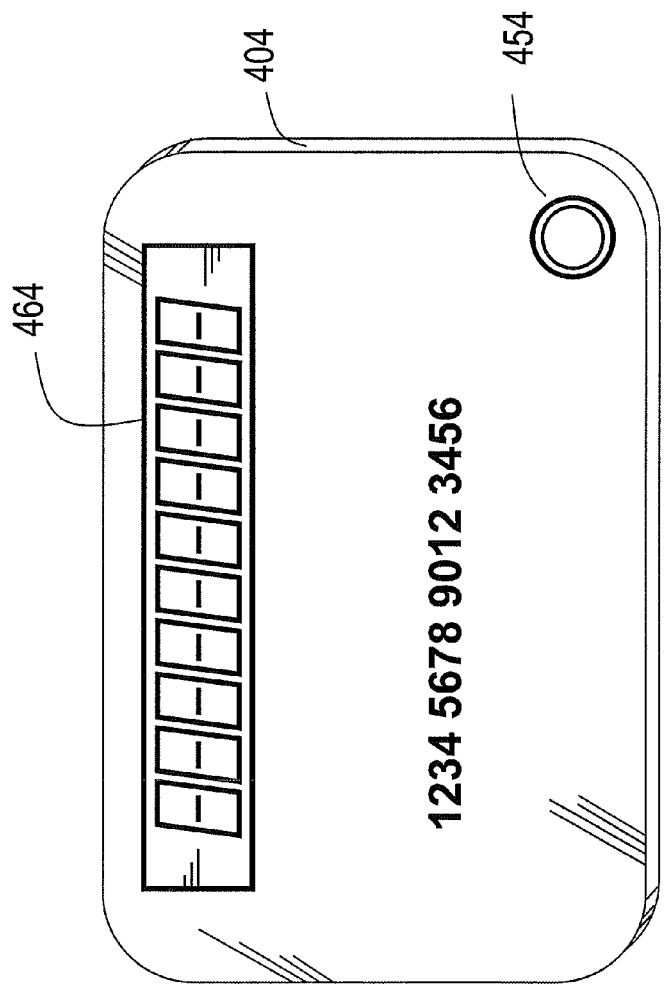
FIG. 4c illustrates yet another form factor of a security apparatus to generate dynamic credentials for different application providers.

FIG. 4c illustrates yet another particular embodiment of a security apparatus according to the invention comprising a token 404 to generate dynamic credentials for different application providers which has the form factor of a credit card. The output interface comprises a display 464. The input interface comprises a button 454. If the user presses the button at least once the token is powered on. The number of times that the button 454 has been pressed determines which application provider or application provider group is currently selected. For example by pressing the button 454 quickly two times, the second application provider or application provider group of the list of supported application providers or application provider groups is selected. To select the third application provider or application provider group of the list the user quickly presses the button 454 three times. The token indicates which application provider or application provider group is currently selected by means of an appropriate label or symbol that is displayed on the display 464. If the user doesn't press the button 454 for more than a certain prefixed time, for example 2 seconds, then the token generates a dynamic credential for the currently selected application provider or application provider group and outputs this generated dynamic credential on its display 464. If however the user presses the button 454 within that prefixed time another application provider or application provider group is selected. In a preferred variant of this embodiment the security apparatus doesn't have the dimensions of a credit card but has the form factor of a traditional one-button strong authentication token.

Figure 4D:
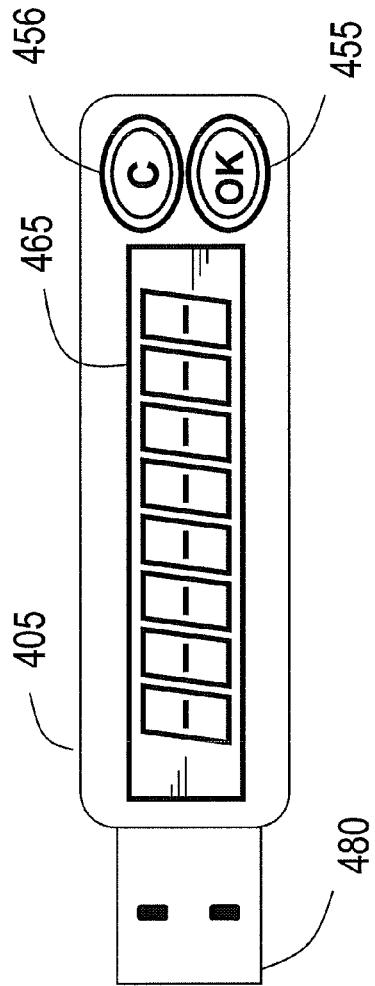
FIG. 4d illustrates still another form factor of a security apparatus to generate dynamic credentials for different application providers.

FIG. 4d illustrates yet another particular embodiment of a security apparatus according to the invention comprising a token 405 to generate dynamic credentials for different application providers. The token 405 comprises an output and an input interface. It may also or alternatively comprise a display 465. The input interface comprises a button 455. The token 405 furthermore comprises machine-to-machine communication interface 480 which may for example comprise a USB connector and a USB controller. When the token 405 is connected to a host computer by means of this machine-to-machine communication interface, an application on the host computer may request the token 405 to generate a dynamic credential for an application provider or application provider group provided by the host computer. By means of the output interface 465 the token 405 indicates to the user for which application provider or application provider group a dynamic credential is requested. For example, the token may show a certain label or symbol on the display 465 that is associated with that application provider or application provider group. By pressing the button 455 the user instructs the token 405 to generate the requested dynamic credential. The token 405 then generates the requested dynamic credential and communicates it to the host through communication interface 480. The token 405 may also comprise another button 456 which the user can press to indicate that the host computer's request must be refused.

Figure 4E:
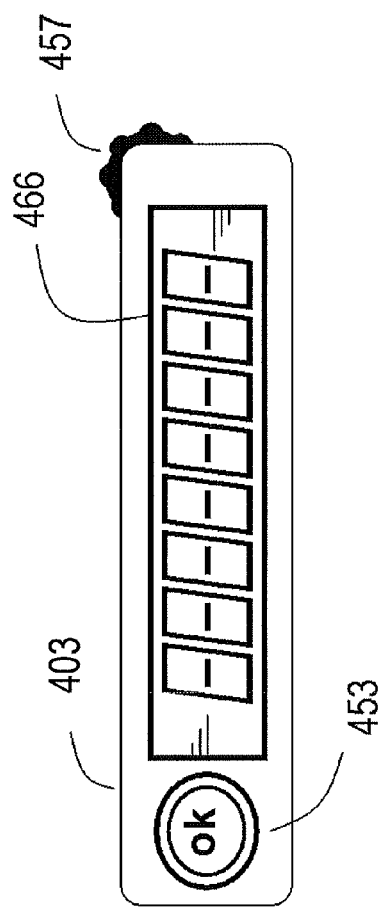
FIG. 4e illustrates one more form factor of a security apparatus to generate dynamic credentials for different application providers.

FIG. 4e illustrates one more particular embodiment of a security apparatus according to the invention comprising a token 403 to generate dynamic credentials. Its output interface comprises a display 466. Its input interface comprises a thumb wheel 457. In one embodiment its input interface may also comprise a button 453. By turning thumb wheel 457 the user can cycle through a list of supported application providers or application provider groups. The token indicates which application provider or application provider group is currently selected by means of an appropriate label or symbol that is displayed on the display 466. In one embodiment the user instructs the token to generate a dynamic credential for the currently selected application provider or application provider group by pressing the thumb wheel. In another embodiment the user presses the button 453 to do this. The token outputs the generated dynamic credential on its display 466.

FIG. 4f illustrates one more particular embodiment of a security apparatus according to the invention comprising a token 408 to generate dynamic credentials. Its output interface comprises a display 468. Its input interface comprises a keypad 458. In a typical embodiment this keypad may comprise keys for the ten decimal digits, a CANCEL key and an OK or ENTER key. By using the keys of keypad 458 the user can select an application provider or application provider group from a list of supported application providers or application provider groups. The token indicates which application provider or application provider group is currently selected by means of an appropriate label or symbol that is displayed on the display 468. Alternatively, it may be possible for the user to enter an application provider indicator by means of the keys of keypad 458. In one embodiment the user instructs the token to generate a dynamic credential for the currently selected application provider or application provider group by pressing the appropriate key or keys, for example the OK or ENTER key. Keypad 458 may also be used to enter a challenge or transaction related data to be used as a dynamic value for the generation of a dynamic credential. The token outputs the generated dynamic credential on its display 468.

Figure 6:
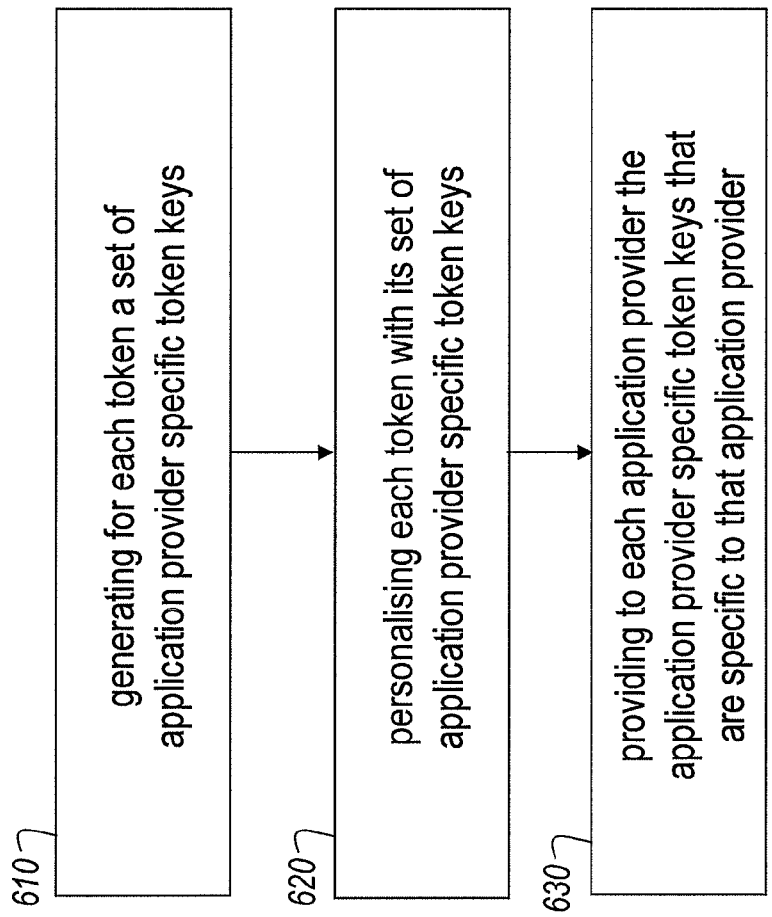
FIG. 6 illustrates a method to manage the secret keys of strong authentication tokens that can generate dynamic credentials for different application providers in accordance with an embodiment of the invention.

FIG. 6 illustrates a method to manage the secret keys of strong authentication tokens that can generate dynamic credentials for different application providers in accordance with an embodiment of the invention. The method comprises the steps of:

generating 610 for each of a batch of strong authentication tokens a set of application provider specific token keys, one application provider specific token key for each of a list of supported application providers or application provider groups;

personalising 620 each token with the set of application provider specific token keys associated with that token;

providing 630 to each application provider (or the entity that will verify on behalf of that application provider the dynamic credentials that are generated for that application provider) separately in a secure manner all the application provider specific token keys that are specific to that application provider.

For security reasons the application provider specific token keys are preferably generated in such a way that their values are unpredictable. For example they may be generated as random values e.g. using a hardware random generator or they may be securely derived from a master secret and an identifier that is unique for each token and another identifier that is unique for each supported application provider. For security reasons it may be preferable that all copies of application provider specific token keys not contained within a token and not under control of the corresponding application provider are destroyed once the tokens have been personalised and the application provider specific token keys have been provided to the corresponding application providers. The application provider specific token keys may be provided to the corresponding application providers by means of files or databases that contain for each token the application provider specific token key for that specific application provider. For security reasons these files or databases are preferably encrypted.

Figure 7:
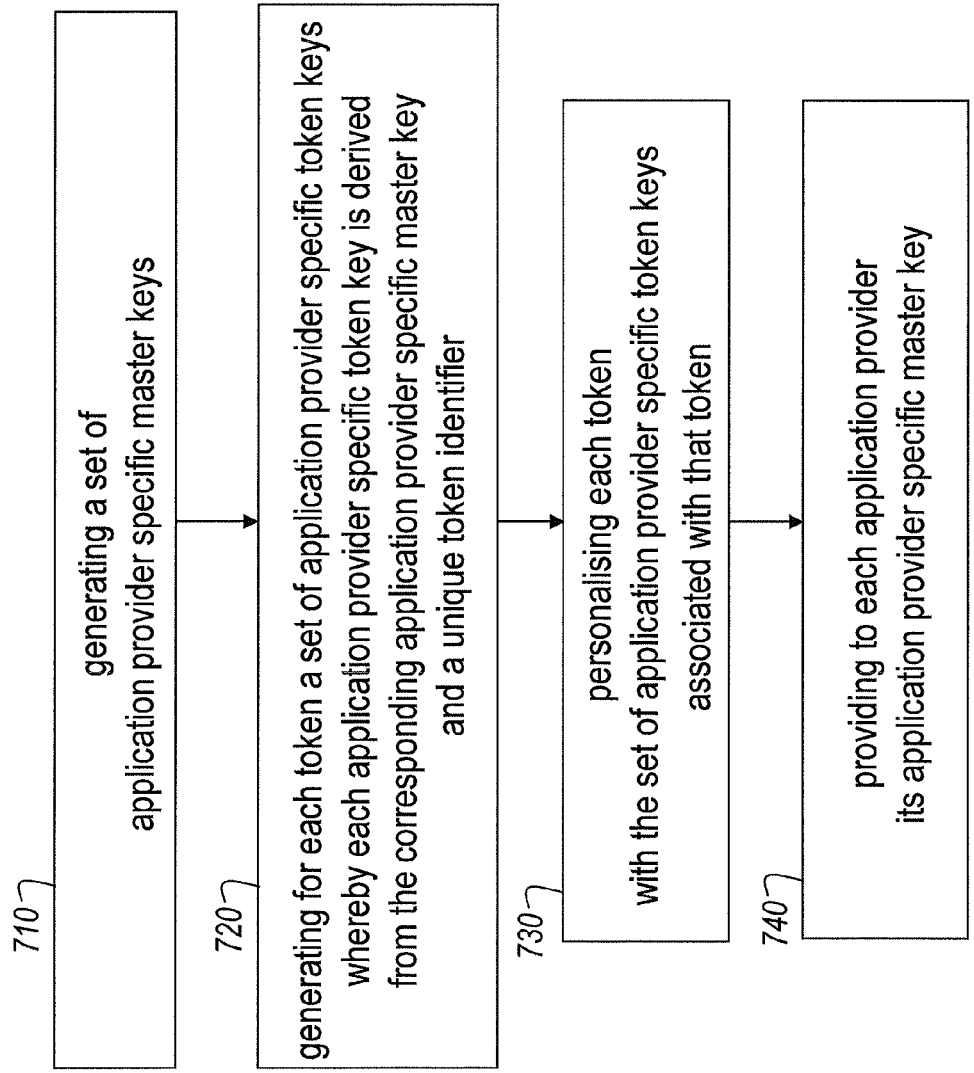
FIG. 7 illustrates another method to manage the secret keys of strong authentication tokens that can generate dynamic credentials for different application providers in accordance with an embodiment of the invention.

FIG. 7 illustrates another method to manage the secret keys of strong authentication tokens that can generate dynamic credentials for different application providers in accordance with an embodiment of the invention. The method comprises the steps of:

generating 710 a set of application provider specific master keys, one application provider specific master key for each of a list of supported application providers or application provider groups;

generating 720 for each of a batch of strong authentication tokens a set of application provider specific token keys, one application provider specific token key for each of a list of supported application providers or application provider groups whereby each application provider specific token key is derived from the corresponding application provider specific master key and a unique identifier of the token such as for example the token's serial number;

personalising 730 each token with the set of application provider specific token keys associated with that token;

providing 740 to each application provider (or the entity that will verify on behalf of that application provider the dynamic credentials that are generated for that application provider) separately in a secure manner the corresponding application provider specific master key.

This method may be preferable in cases whereby the application providers don't wish to keep a database or list of application provider specific token keys, but instead derive the application provider specific token keys from their application provider specific master key and the token's unique identifiers when they are needed (for example to verify a dynamic credential). For security reasons it may be preferable that all copies of an application provider specific master key not under control of the corresponding application provider are destroyed once the corresponding application provider specific token keys have been generated and the application provider specific master key has been provided to the corresponding application provider.

FIG. 8 illustrates yet another method to manage the secret keys of strong authentication tokens that can generate dynamic credentials for different application providers in accordance with an embodiment of the invention. The method comprises the steps of:

generating 810 for each of a batch of strong authentication tokens a token specific master key;

personalising 820 each token with the token specific master key associated with that token;

generating 830 for each of a list of supported application providers or application provider groups a set of application provider specific token keys, one application provider specific token key for each token, whereby each application provider specific token key is derived from that token's token specific master key and a unique identifier or indicator of that application provider or application provider group;

providing 840 to each application provider (or the entity that will verify on behalf of that application provider the dynamic credentials that are generated for that application provider) separately in a secure manner the corresponding set of application provider specific token keys.

This method may be preferable in cases whereby the tokens' secure key storage is not large enough to contain separate keys for each supported application provider or application provider group, or in cases whereby the list of supported application providers is not fixed and known at the time of personalising the tokens. The latter may be the case if it is a requirement that at any time (for example also after personalisation and distribution of the tokens) new application providers may be added to the list of supported application providers. This can be accommodated by tokens that allow the user to enter the value of the application provider indicator. If there is no requirement that new application providers may be added at any time to the list of supported application providers then it may be preferable for security reasons that all copies of the token specific master keys that are not contained in a token are destroyed once the tokens have been personalised and the sets of application provider specific token keys for all supported application providers have been generated and provided to the corresponding application providers.

The methods illustrated by FIGS. 6, 7 and 8 may also be used for any strong authentication tokens that generate dynamic credentials using different secret keys.

While various embodiments of the present invention have been described above, it should be understood that they have been presented by way of example only, and not limitation. Thus, the breadth and scope of the present invention should not be limited by any of the above described exemplary embodiments but should be defined only in accordance with the following claims and their equivalents.

The invention claimed is:

1. An apparatus for generating different dynamic credentials for a plurality of different application providers for securing access by a user of the apparatus to more than one application provided by said different application providers, the apparatus comprising:
   a user input interface configured to receive from a user of the apparatus an input that is indicative of a particular application provider of the plurality of different application providers, and in response to receiving said input, output an application provider indicator that is unique to the particular application provider;
   a secret key storage for storing one or more secret keys, said secret key storage stores a token specific master key;
   a variability source for providing a dynamic variable value;
   a credential generator for generating dynamic credentials for the particular application provider by cryptographically combining one or more keys stored in said secret key storage with said dynamic variable value and a value related to said application provider indicator, the credential generator comprising:
      a key providing agent for providing an application provider specific key as a function of said application provider indicator using one or more keys stored in said secret key storage; and
      a cryptographic agent for cryptographically combining said application provider specific key with said dynamic variable value;
   and an output interface to output said dynamic credentials to said user;
   wherein said key providing agent derives said application provider specific key from said application provider indicator related value and said token specific master key stored in said key storage.

2. The apparatus of claim 1 wherein said credential generator uses symmetric cryptography to cryptographically combine said one or more keys with said dynamic variable value and said application provider indicator related value.

3. The apparatus of claim 1 wherein said cryptographic agent uses symmetric cryptography for cryptographically combining said application provider specific key with said dynamic variable value.

4. The apparatus of claim 1 further comprising a transformation agent coupled between said cryptographic agent and said output interface for transforming an output of said cryptographic agent to produce said dynamic credential.

5. The apparatus of claim 1 wherein said input interface comprises a human interface device responsive to a user selection for selecting an application provider indicator.

6. The apparatus of claim 1 wherein said input interface comprises a human interface device responsive to a user entering an application provider indicator.

7. The apparatus of claim 1, wherein the apparatus is a handheld, battery-powered apparatus.

8. A method to manage the secret keys of strong authentication tokens that can generate dynamic credentials for more than one supported application provider or application provider group using different secret keys for each supported application provider or application provider group comprising:
   generating for each of a batch of strong authentication tokens a token specific master key;
   personalizing each token of said batch with the token specific master key associated with said token for use by the personalized tokens to dynamically generate credentials by deriving a token application provider specific key from a value identifying a particular one of the plurality of supported application providers or application provider groups and the token specific master key and cryptographically combining the token application provider specific key with a dynamic variable value;
   obtaining, for each of a plurality of supported application providers or application provider groups, a unique identifier or indicator;
   generating, for each of the plurality of supported application providers or application provider groups, a set of application provider specific token keys, one application provider specific token key for each token of said batch, whereby each set of application provider specific token keys comprises a different application provider specific token key for each token of said batch, and each application provider specific token key of each of said sets is derived from that token's token specific master key and the unique identifier or indicator obtained for that application provider or application provider group;
   providing to each application provider, or entity that is responsible for the verification on behalf of said application provider, the set of application provider specific token keys that corresponds to said application provider, to enable the verification of dynamic credentials generated by said tokens for said application provider.

9. The method of claim 8 further comprising destroying all copies of said token specific master keys that are not contained in a token after personalization of said tokens and after said sets of application provider specific token keys have been generated for all said supported application providers.

* * * * *